(12) United States Patent
Tombu

(10) Patent No.: US 6,637,607 B2
(45) Date of Patent: Oct. 28, 2003

(54) RACK FOR SUPPORTING CIRCULARLY SYMMETRICAL CONTAINERS

(75) Inventor: Nicolas Tombu, Les Gonds (FR)

(73) Assignee: Tonnellerie Baron, Les Gonds (FR)

( * ) Notice: Subject to any disclaimer, the term of this patent is extended or adjusted under 35 U.S.C. 154(b) by 0 days.

(21) Appl. No.: 09/957,647

(22) Filed: Sep. 21, 2001

(65) Prior Publication Data

US 2002/0036178 A1 Mar. 28, 2002

(30) Foreign Application Priority Data

Sep. 22, 2000 (FR) .............................. 00 12076

(51) Int. Cl.$^7$ .................................. A47F 7/00
(52) U.S. Cl. .................. 211/85.22; 211/189; 211/59.4; 410/49
(58) Field of Search ............................. 211/85.22, 189, 211/59.4, 85.18, 74; 410/49

(56) References Cited

U.S. PATENT DOCUMENTS

| | | | | |
|---|---|---|---|---|
| 921,855 A | * | 5/1909 | Loskamp | |
| 1,938,126 A | * | 12/1933 | Thompson | |
| 3,019,916 A | * | 2/1962 | Malcher | |
| 4,270,662 A | * | 6/1981 | Gonzalez | 211/74 |
| 4,431,107 A | * | 2/1984 | Bergstrom et al. | 211/189 X |
| 4,506,796 A | * | 3/1985 | Thompson | 211/59.4 |
| 5,370,245 A | * | 12/1994 | Tersch et al. | 211/74 |
| 5,735,412 A | * | 4/1998 | Sheckells | 211/59.4 |
| 5,947,305 A | * | 9/1999 | Lin | 211/74 |
| 5,984,119 A | * | 11/1999 | Uhl | 211/59.4 |
| 6,050,538 A | * | 4/2000 | Marrow et al. | |
| 6,360,903 B1 | * | 3/2002 | Flores | 211/85.22 |

* cited by examiner

Primary Examiner—Robert W. Gibson, Jr.
(74) Attorney, Agent, or Firm—Dennison, Schultz & Dougherty

(57) ABSTRACT

The invention relates to a rack for supporting cask-type containers. The rack comprises a plurality of modular structures each suitable for receiving a single container, each modular structure presenting a back vertical mean plane and a substantially parallel front vertical mean plane, and having top fixing points, bottom fixing points, and support means close to said bottom fixing points, said support means being substantially contained in a horizontal plane so as to support a container. The modular structures are connected to one another via their fixing points on a horizontal axis and on a vertical axis so that each upper modular structure straddles two lower modular structures.

12 Claims, 2 Drawing Sheets

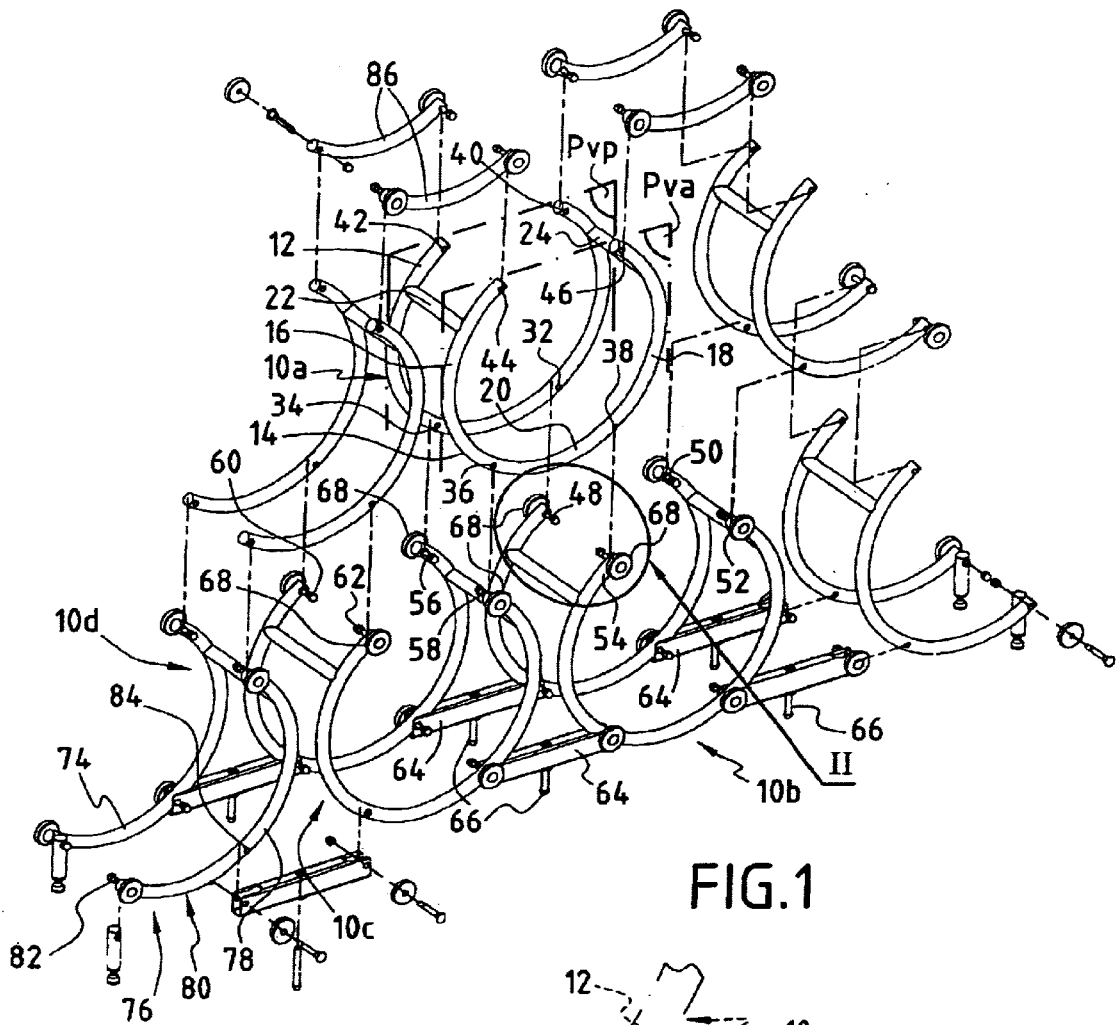
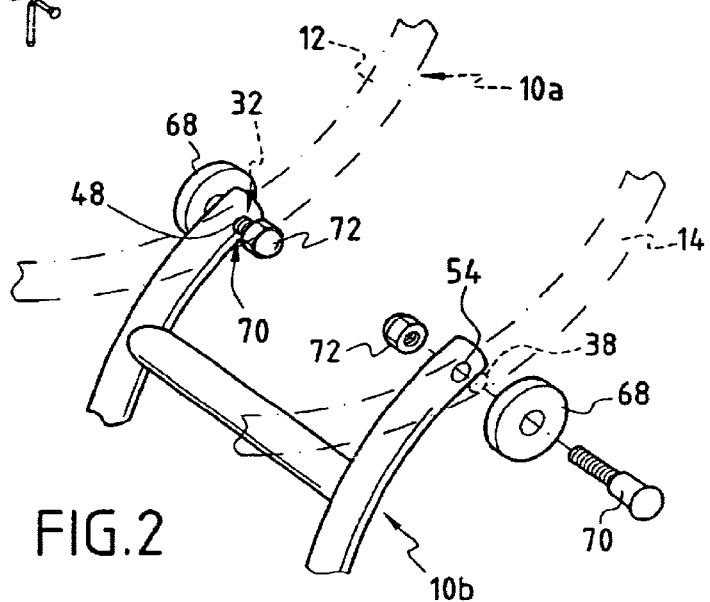

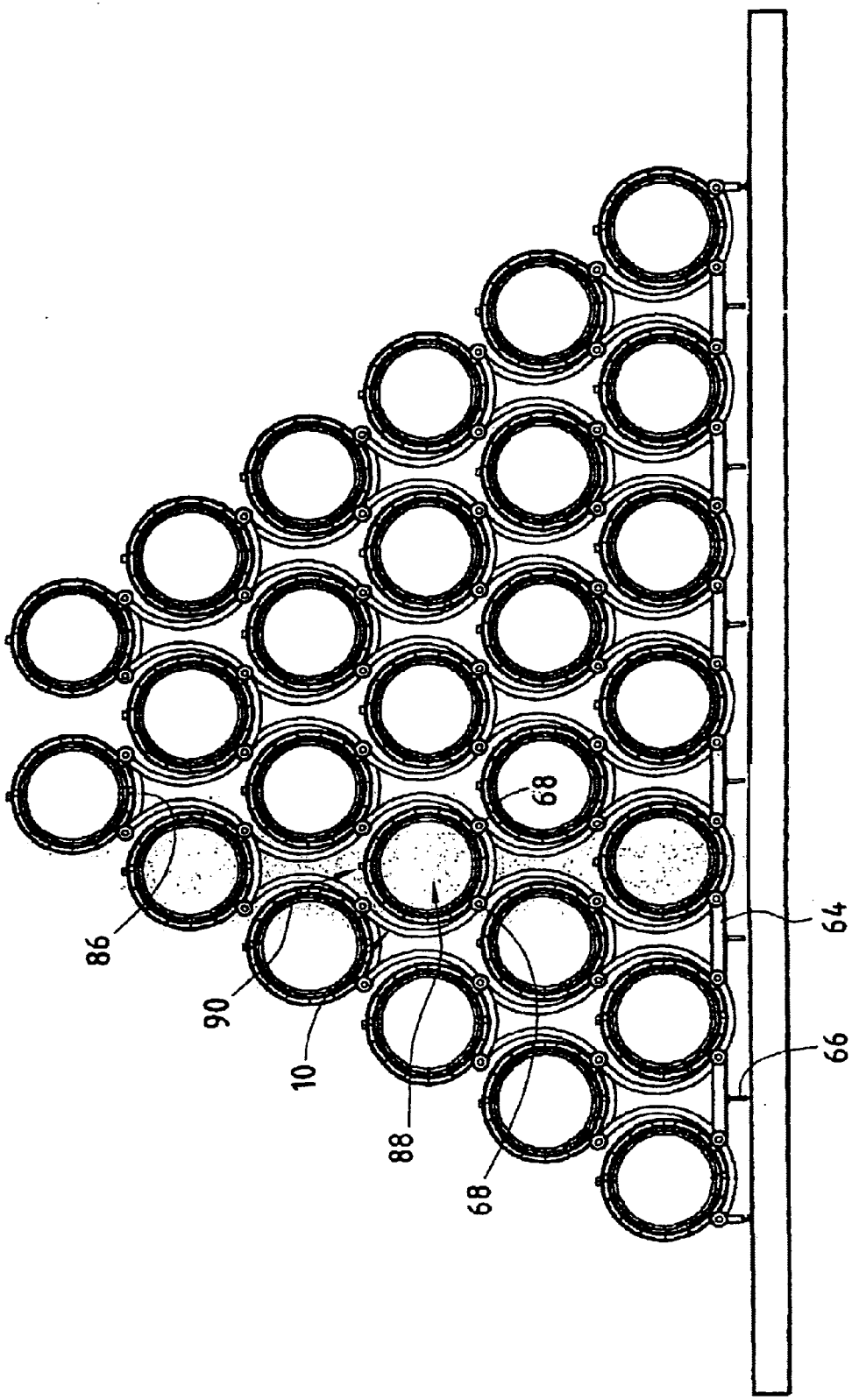

RACK FOR SUPPORTING CIRCULARLY SYMMETRICAL CONTAINERS

The present invention relates to a rack for supporting containers, and more particularly casks suitable for containing liquids.

BACKGROUND OF THE INVENTION

Various types of cask are known for containing and storing liquids. In general, they present a first wall portion of generally cylindrical shape closed at each of its two ends by two identical, end-forming circular second wall portions, with the longitudinal axis of such a cask generally intersecting said second wall portions substantially perpendicularly. Filling or emptying orifices are pierced in one or both of the second endwall-forming portions and/or in the first wall portion, generally in the middle thereof.

It is known that circularly symmetrical containers can be stacked together in a vertical plane so that the longitudinal axis of each container is substantially perpendicular to said vertical plane with the second wall portions of the containers coinciding so as to form two vertical mean planes that are parallel to each other.

Thus, containers are lined up side by side to form a first row on which a second row is then built up in such a manner that each second row container bears on two containers in the first row. In identical manner, higher rows are formed, up to a limit where only one container can be arranged to bear on two lower containers.

As a result a generally pyramid-shaped structure is obtained. Nevertheless, given the size of the stacked containers, the number of rows that can be superposed is limited in order to ensure that the assembly is stable.

However, storing circularly symmetrical containers in that way suffers from a major drawback associated with filling or emptying said containers once stacked. To empty a container as completely as possible, a container which is positioned so that its longitudinal axis is horizontal needs to be turned so as to ensure that its orifice which is pierced off-center through the periphery of one of its two end-forming second wall portions is located level with the bottom of the inside volume of the container. Unfortunately, when the containers are resting on one another, it is not possible to turn them easily so as to bring their orifices into the bottom position; and if the containers are full while they are being stacked, it is difficult to ensure that they take up this position accurately during stacking.

Furthermore, it is not possible to remove a container from a lower row without removing containers from the upper rows.

OBJECTS AND SUMMARY OF THE INVENTION

The invention seeks to provide a rack for supporting containers that enables the above-specified drawbacks to be remedied while retaining the advantages provided by stacking, in terms of the amount of space that is occupied.

This object is achieved with the rack of the invention which comprises:

a plurality of modular structures each suitable for receiving a single container, each modular structure presenting a back vertical mean plane and a substantially parallel front vertical mean plane, and each comprising top fixing points, bottom fixing points, and support means close to said bottom fixing points, said support means lying substantially in a horizontal plane so as to support a container whose longitudinal axis is substantially perpendicular to said back and front vertical mean planes;

and wherein said modular structures are interconnected via their fixing points on a horizontal axis and on a vertical axis so that the front vertical mean planes and the back vertical mean planes of said modular structures coincide and so that every upper modular structure straddles two lower modular structures, thereby enabling said containers to be placed in a staggered configuration in a vertical plane, thereby permitting free access to the top portion of each one of said containers.

Thus, a characteristic of the invention lies in the way in which containers are stored by being stacked in a vertical plane with their longitudinal axes being substantially perpendicular to said vertical plane, but in a modular structure in which they are supported independently by support means. As a result, the containers can be inserted or withdrawn from the set of containers, independently of one another.

Furthermore, the modular structures are superposed in such a manner that the containers are disposed in a staggered configuration, thereby optimizing occupancy of the available space.

In addition, according to an advantageous characteristic, each modular structure comprises:

a back structure element and a front structure element facing each other, each structure element being constituted by two facing arcs, the mean line of an arc being substantially vertical so that each arc presents a top end and a bottom end, said arcs being interconnected by a link arc so that the concave sides of said two arcs and of the link arc all face towards the inside of said structure, and so that each of said structure elements is substantially in the form of a portion of a circle whose diameter is greater than the maximum diameter of the cask;

link rods suitable for interconnecting said back and front structure elements;

and said top and bottom ends of said two arcs of said back and front structure elements respectively contained in said back and front vertical mean planes, respectively constitute said top fixing points and said bottom fixing points of said modular structure.

Thus, the modular structure forms a cradle into which a container can be inserted between said structure elements and placed on said support means so that the longitudinal axis of the container is substantially perpendicular to the back mean plane and to the front mean plane.

In addition, it will be understood that in accordance with this advantageous characteristic of the invention, the bottom ends of the structure elements of an upper modular structure constitute four bottom fixing points of said modular structure suitable for being connected to four fixing points constituted by the top ends of the arcs of two contiguous lower modular structures. Thus, the two lower modular structures are interconnected by the upper structure which straddles them. This configuration can be reproduced as often as desired in order to build up a rack of the invention.

The modular structures are relatively simple to construct given their component elements, and they can be assembled in accordance with the number of containers to be stored.

According to another advantageous characteristic, said support means are constituted by rolling members, each rolling member being free to rotate about the first end of a shaft;

and each bottom end of said back and front structure elements has a rolling member connected to said bottom end by the second end of the shaft of said support means.

Thus, another characteristic of the invention lies in the way in which the containers are supported so as to enable the containers to be turned around their own longitudinal axes within the modular structure while applying a minimum amount of force, even when a container is full. This disposition makes it possible to adjust the positions of emptying or filling orifices without needing to separate the container from its support. Each modular structure has four rolling members, each being connected to the bottom end of an arc so that the four members together substantially define a horizontal rectangular parallelogram. It will be understood that the lengths of the sides of the parallelogram must be shorter than the lengths of the sides of the outline of a projection of the container onto a tangential plane in order to ensure that the container is supported by the rolling members.

Each rolling member is mounted to rotate freely on the end of a shaft which is fixed to the bottom end of an arc so as to be substantially perpendicular to the vertical mean planes. As a result, each rolling member is free to rotate in a plane that is substantially parallel to the vertical mean planes, which means that very little friction arises while a container is being rotated.

In a preferred embodiment of the invention, each structure element forms a single piece, said two facing arcs and said link arc being constituted by a single hoop portion presenting two free ends separated by a gap. Thus, each structure element is made by curving a rod into a truncated hoop shape and is constituted by a single piece. This disposition makes it possible to make structure elements at advantageous cost.

In another preferred embodiment of the invention, the back structure element and the facing front structure element are mechanically interconnected by link rods that are substantially perpendicular to said back and front vertical mean planes so as to constitute the rigid modular structure.

In a particularly advantageous embodiment of the invention, said second ends of the shafts of said rolling members also form fixing means suitable for connecting the top fixing points of a modular structure to the bottom fixing points of a modular structure above it. Thus, the shafts of the rolling members serve to perform two functions: one is to hold a rolling member in a position that is fixed relative to a structure element; the other is to interconnect two superposed modular structures. As a result, the weakening of the modular structure that would be caused by piercing a curved rod specifically to receive the shaft of the rolling member does not occur, and the rack is simpler to assemble.

Advantageously, said free ends of said hoops constitute the top fixing points of the modular structure, enabling said modular structure to present a space in its top portion suitable for being penetrated, at least between said free ends. Since each of the two free ends of a lower hoop is connected to the bottom end of an upper hoop, an empty space is situated vertically above said space portion between the two upper hoops. As a result, and as explained in greater detail in the description below, appropriate tooling can be inserted above a container to take hold of it at each end, to lift it, and to withdraw it from the rack along an axis perpendicular to the vertical mean planes, and independently of the other containers.

Preferably, the link rod mechanically connects the top portion of each arc of a back structure element to the top portion of the arc of the facing front structure element. This configuration makes it possible to ensure that bulging containers are not prevented from rotating. With a bulging container, the envelope defined by two facing hoops can intersect a bottom portion of the container, thereby defining an intersection surface, and the container would be prevented from rotating if a link rod were to be contained in said intersection surface or to intersect it.

In a particular embodiment, the rack further comprises bottom link members suitable for interconnecting two contiguous bottom modular structures, and top link members suitable for interconnecting two contiguous top modular structures, so that they are connected together respectively via their bottom portions and via their top portions. Since the first row of modular structures situated next to the ground does not have any lower modular structures to interconnect them, special bottom link members are provided. The same applies to the last or top-most row of the rack for which special top link members are likewise provided.

In yet another particular embodiment, the support means are constituted by shaft portions, each bottom end of an arc of said back and front structure elements including a shaft portion suitable for supporting a container in a fixed position.

BRIEF DESCRIPTION OF THE DRAWINGS

Other characteristics and advantages of the invention will appear on reading the following description of particular embodiments of the invention, given by way of non-limiting indication, and made with reference to the accompanying drawings, in which:

FIG. 1 is a three-quarters exploded view of a rack, constituting a particular embodiment of the invention and showing the variant elements constituting the rack;

FIG. 2 is a fragmentary detail view referenced II in FIG. 1, and showing one of the elements of the invention; and FIG. 3 is a front view showing a rack having twenty-seven containers stored in the rack in six superposed rows.

MORE DETAILED DESCRIPTION

Reference is made initially to FIG. 1 for a general description of the component elements of the invention and how they are arranged.

Each modular structure 10 comprises two identical structure elements: a back structure element 12; and a front structure element 14 facing each other and respectively defining a back vertical mean plane Pvp and a front vertical mean plane Pva, which planes are referenced in FIG. 1 for one particular modular structure 10a, the two planes Pvp and Pva being substantially parallel to each other.

Each structure element comprises two identical vertical arcs 16 and 18 that face each other, with their bottom ends being interconnected by a link arc 20. The arcs 16, 18, and 20 are concave towards the inside. For practical reasons, the structure elements are made as single pieces by curving a tubular section member to form a portion of a hoop.

The structure elements 12 and 14 are mechanically interconnected near the top by identical link rods 22 and 24 so as to obtain a rigid modular structure. The link rods 22 and 24 can be welded at opposite ends to the structure elements, or they can be connected to said structure elements by means that can be disassembled.

In addition, the modular structure 10a has bottom fixing points 32, 34, 36, and 38 corresponding to the bottom ends of the vertical arcs 16 and 18, and to the bottom ends of the vertical arcs of the back structure element 12. The modular structure 10a also has top fixing points 40, 42, 44, and 46 corresponding to the top ends of the vertical arcs 16 and 18 and to the top ends of the vertical arcs of the back structure element 12.

The bottom fixing points 32, 34, 36, and 38 and the top fixing points 40, 42, 44, and 46 are constituted by holes made through the modular structure perpendicularly to the vertical mean planes Pvp and Pva so that the bottom fixing points 32, 34, 36, and 38 are contained in a horizontal plane parallel to the plane defined by the top fixing points 40, 42, 44, and 46, and so that the top fixing points constitute respective images of the bottom fixing points as obtained by orthogonal translation in the planes they define.

The modular structure 10a is shown as being above two modular structures 10b and 10c that are contiguous and on which the structure 10a bears so as to be fixed in such a manner as to straddle them. The two modular structures 10b and 10c are contained in the first row which is placed on the ground, and the modular structure 10a straddling them belongs to the second row.

The modular structures 10b and 10c are identical to the modular structure 10a and likewise present respective top fixing points 48, 50, 52, & 54 and 56, 58, 60, & 62. The modular structure 10a is thus fixed to the modular structures 10b and 10c in such a manner as to ensure that the bottom fixing points 32 and 38 of the structure 10a are connected to the top fixing points 48 and 54 respectively of the structure 10b, and the bottom fixing points 34 and 36 are connected to the top fixing points 56 and 58, respectively.

As a result, the modular structures 10b and 10c constitute a support for the modular structure 10a, and the modular structure 10a constitutes link means between the contiguous structures 10b and 10c. In addition, the bottom fixing points of the contiguous structures are interconnected in pairs by bottom link members 64 so as to ensure that the connection between the two structures 10b and 10c is rigid. These special bottom link members 64 are designed to interconnect the bottom portions of the modular structures constituting the said first row which is placed on the ground.

Leg-forming rods 66 project beneath the bottom link members 64 and stand directly on the ground. Thus, even though the horizontal plane defined by the bottom link member 64 is situated above the link arcs of the back and front structure elements constituting the modular structures of said first row, said link arcs themselves do not come into contact with the ground.

The modular structures 10 are designed to receive containers, in particular for the purpose of storing them, and for this purpose they include support means.

A characteristic of the invention lies in the fact that the support means comprise identical rolling members 68 situated at the bottom ends of each modular structure 10. For manifest reasons of clarity, only the rolling member 68 of modular structure 10a are given references in FIG. 1.

An advantageous characteristic of the invention lies in the way the modular structures 10 are fixed to one another so as to enable the rolling member 68 also to be held in place.

Reference is made to FIG. 2 while describing the component elements of this fixing in greater detail.

FIG. 2 shows a portion of the modular structure 10a and a portion of the modular structure 10b, together with the rolling members 68. There can also be seen the bottom fixing points 32 and 38 of the modular structure 10a and the top fixing points 48 and 54 of the modular structure 10b as constituted by holes.

The modular structures 10a and 10b are disposed in such a manner that the holes in the two facing structure elements 12 and 14 coincide with the holes in the two structure elements of the modular structure 10b. Advantageously, the structure elements of all of the modular structures 10 have the same spacing so that the modular structures 10a and 10b can be positioned so that the back wall of the modular structure 10a presses against the front wall of the modular structure 10b. A shaft 70 has a first end on which the rolling member 68 is mounted to rotate and passes through the two coinciding holes to be locked in place by a nut 72 screwed onto its second end. Naturally, the shaft 70 has a shoulder in its middle portion suitable for co-operating with the retaining nut 72 to form an abutment that ensures that the rolling member 68 is not impeded in its rotation.

Furthermore, implementing a rack of the invention requires the rolling members 68 to be of a diameter that is greater than the thickness of the arcs so that a fraction of the envelope defined by two rolling members of a modular element 10 and lying on substantially the same axis is not intersected by said arcs.

The description of the way these two portions are arranged can be generalized for all of the fixing points of the rack.

Given the shape of the modular structures 10 in the form of two facing truncated hoop portions, cylindrically symmetrical containers are inserted into corresponding modular structures so that the longitudinal axis of each container is perpendicular to the back and front vertical mean planes of said modular structures. Naturally, the maximum diameter of a container must be smaller than the diameter of the truncated hoops in order to ensure that it is possible for the containers to be inserted and put down on the rolling members.

The rolling members project into the insides of the hoops, so containers supported on four rolling members of a modular structure can be rotated about their own longitudinal axes without touching the hoops.

Advantageously, special modular structures are also provided for the ends of the rows. Since the containers of an upper row are situated between two containers of the row immediately beneath, each upper row has one container fewer than the row beneath it.

With reference to FIG. 1, a particular modular structure is described for an end.

The modular structure 10d likewise comprises a back structure element 74 and a front structure element 76 that face each other and that are situated respectively in the back vertical mean plane and in the front mean vertical mean plane as defined by the structure elements of the modular structure 10c which it extends.

However, each structure element is constituted by a single vertical arc 78 contiguous with the vertical arc of the modular structure 10c, and extended by a link arc 80. This structure element is made as a single circularly-arcuate piece.

The two ends 82 and 84 of the link arc 80 constitute the bottom fixing points on which the rolling members 68 are mounted, and the top end of the vertical arc constitutes the top fixing point of the modular structure 10d on which a rolling member 68 is likewise mounted so as to co-operate with the rolling member 68 of the contiguous modular structure 10c to constitute support means.

Furthermore, particular top link members 86 are also provided that are constituted by special modular structures each comprising a structure element made up of a single link arc suitable for interconnecting two contiguous lower modular structures. Each of the ends of a top link member 86 has a rolling member so as to enable a container to be placed on the link members 86.

Reference is made to FIG. 3 for describing a particular embodiment of a rack of the invention in which twenty-seven containers are stacked.

In FIG. 3, there can be seen identical modular structures 10 in which containers 88 have been inserted. The containers 88 are supported on the rolling members 68 and they can be rotated so as to bring their filling or emptying orifices into position.

It will be understood that the particular disposition of the containers provided by a rack of the invention presents an advantage when accessing the top portions of the containers 88, and in particular their filling orifices 90, since they are situated between two adjacent upper containers.

In addition, the space situated between two containers in an upper row and overlying a container in a lower row is available for receiving a tool suitable for taking hold of the end of the lower container and withdrawing it.

Naturally, this particular embodiment is not limiting in any way and it would not go beyond the ambit of the invention to provide a rack for stacking containers in a vertical plane in some other configuration and comprising more than twenty-seven containers or fewer than twenty-seven containers.

In a particular embodiment of the invention that is not shown, the support means are constituted by fixed shafts suitable for interconnecting the fixing points of the modular structures.

What is claimed is:

1. A rack for supporting cask-type containers presenting respective longitudinal axes, the rack comprising:
    a plurality of modular structures, wherein each of said plurality of modular structures has a back vertical mean plane and a substantially parallel front vertical mean plane, and each of said plurality of modular structures further comprising a plurality of top fixing points at said back vertical mean plane and a plurality of top fixing points at said front vertical mean plane, a plurality of bottom fixing points at said back vertical mean plane and a plurality of bottom fixing points at said front vertical mean plane, and support means close to said plurality of bottom fixing points or said front and back vertical mean planes, wherein said support means lying substantially in a horizontal plane so as to support a container having a longitudinal axis substantially perpendicular to said front and back vertical mean planes; and
    wherein said plurality of front vertical mean plane bottom fixing points of one of said plurality of modular structures being secured to said front vertical mean plane top fixing points of another one of said plurality of modular structures, and back vertical mean plane bottom fixing points of one of said plurality of modular structures being secured to back vertical mean plane top fixing points of another one of said plurality of modular structures, thereby interconnecting the modular structures to create said rack.

2. A rack for supporting cask-type containers presenting respective longitudinal axes, the rack comprising:
    a plurality of modular structures, wherein each of said plurality of modular structures has a back vertical mean plane and a substantially parallel front vertical mean plane, and each of said plurality of modular structures further comprising a plurality of top fixing points at said back vertical mean plane and a plurality of top fixing points at said front vertical mean plane, a plurality of bottom fixing points at said back vertical mean plane and a plurality of bottom fixing points at said front vertical mean plane, and support means lying substantially in a horizontal plane so as to support a container having a longitudinal axis substantially perpendicular to said front and back vertical mean planes; and
    wherein said plurality of front vertical mean plane bottom fixing points of one of said plurality of modular structures being secured to said front vertical mean plane top fixing points of at least another one of said plurality of modular structures, and said plurality of back vertical mean plane bottom fixing points of one of said plurality of modular structures being secured to said plurality of back vertical mean plane top fixing points of at least another one of said plurality of modular structures, thereby interconnecting the modular structures to create said rack.

3. A rack for supporting cask-type containers presenting respective longitudinal axes, the rack comprising:
    a plurality of modular structures, wherein each of said plurality of modular structures has a back vertical mean plane and a substantially parallel front vertical mean plane, and each of said plurality of modular structures further comprising two top fixing points at said back vertical mean plane and two top fixing points at said front vertical mean plane, two bottom fixing points at said back vertical mean plane and two bottom fixing points at said front vertical mean plane, and support means lying substantially in a horizontal plane so as to support a container having a longitudinal axis substantially perpendicular to said front and back vertical mean planes; and
    wherein said two front vertical mean plane bottom fixing points of one of said plurality of modular structures being respectively secured to one of said two front vertical mean plane top fixing points of another first one of said plurality of modular structures and to one of said two front vertical mean plane top fixing points of another second one of said plurality of modular structures, and said two back vertical mean plane bottom fixing points of one of said plurality of modular structures being respectively secured to one of said two back vertical mean plane top fixing points of another first one of said plurality of modular structures and to one of said two back vertical mean plane top fixing points of another second one of said plurality of modular structures, thereby interconnecting the modular structures to create said rack.

4. A rack for supporting containers according to claim 1, wherein each modular structure comprises:
    a back structure element and a front structure element facing each other, each structure element being constituted by two facing arcs, the mean line of an arc being substantially vertical so that each arc presents a top end and a bottom end, said arcs being interconnected by a link arc so that the concave sides of said two arcs and of the link arc all face towards the inside of said structure, and so that each of said structure elements is substantially in the form of a portion of a circle whose diameter is greater than the maximum diameter of the cask;
    link rods suitable for interconnecting said back and front structure elements;

and wherein said top and bottom ends of said two arcs of said back and front structure elements respectively contained in said back and front vertical mean planes, respectively constitute said top fixing points and said bottom fixing points of said modular structure.

5. A rack for supporting containers according to claim 4, wherein said support means are constituted by rolling members, each rolling member being free to rotate about the first end of a shaft;

and wherein each bottom end of said back and front structure elements has a rolling member connected to said bottom end by the second end of the shaft of said support means.

6. A rack for supporting containers according to claim 4, wherein each structure element forms a single piece, said two facing arcs and said link arc being constituted by a single hoop portion presenting two free ends separated by a gap.

7. A rack for supporting containers according to claim 4, wherein the back structure element and the facing front structure element are mechanically interconnected by link rods that are substantially perpendicular to said back and front vertical mean planes.

8. A rack for supporting containers according to claim 5, wherein said second ends of the shafts of said rolling members also form fixing means suitable for connecting the top fixing points of a modular structure to the bottom fixing points of a modular structure above it.

9. A rack for supporting containers according to claim 6, wherein said free ends of said hoops constitute the top fixing points of the modular structure enabling said modular structure to present a space in its top portion suitable for being penetrated, at least between said free ends.

10. A rack for supporting containers according to claim 7, wherein the link rod mechanically connects the top portion of each arc of a back structure element to the top portion of the arc of the facing front structure element.

11. A rack for supporting containers according to claim 1, the rack further comprising a plurality of link members suitable for interconnecting said plurality of modular structures to one another.

12. A rack for supporting containers according to claim 4, wherein said support means are constituted by shaft portions, each bottom end of an arc of said back and front structure elements including a shaft portion.

* * * * *